March 4, 1969　　　W. WELLSTEIN　　　3,430,697
PIPE CASING SIDE CONNECTOR

Filed Aug. 16, 1965　　　　　　　　　　　　Sheet 1 of 7

INVENTOR.
WILLIAM WELLSTEIN
BY
*Hugh A. Kirk*
ATTORNEY

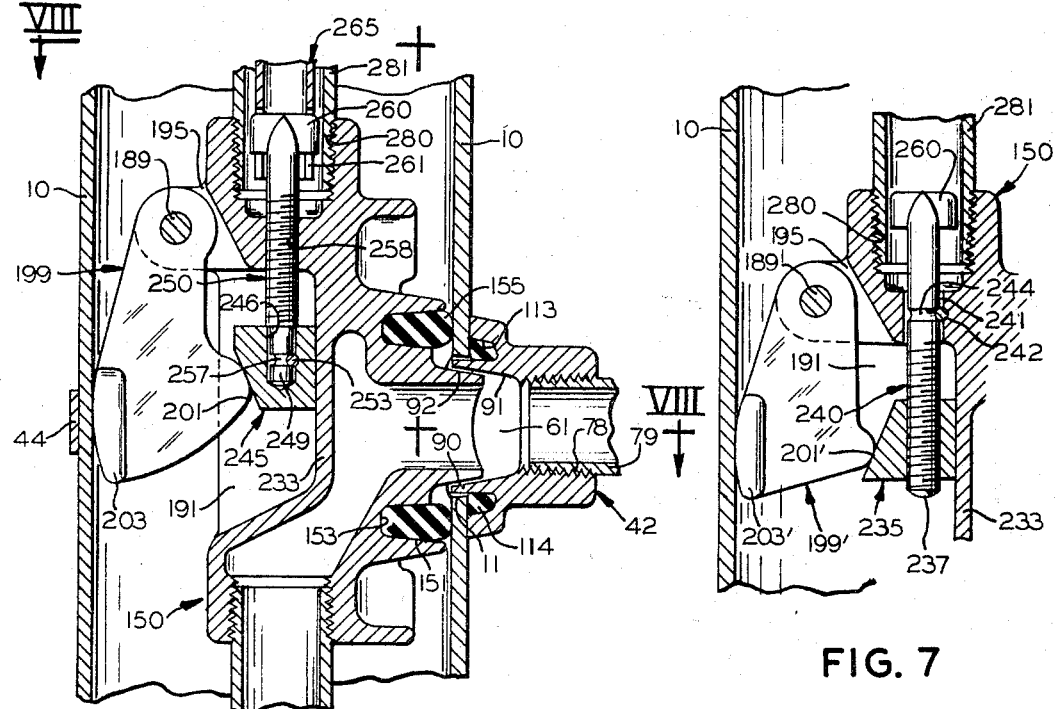
FIG. 6
FIG. 7
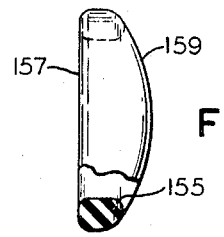
FIG. 9
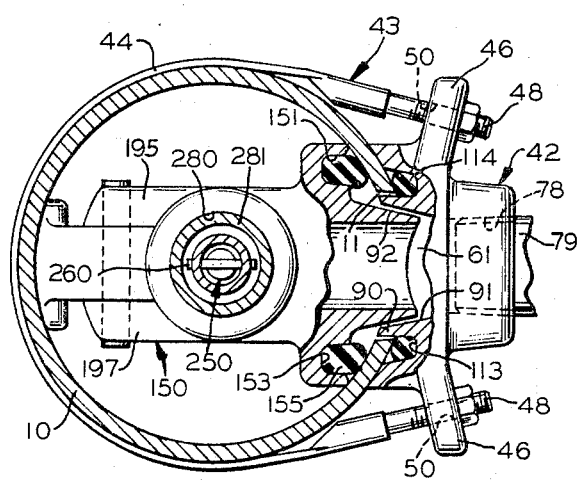
FIG. 8
FIG. 10
INVENTOR.
WILLIAM WELLSTEIN
BY Hugh A. Kirk
ATTORNEY

United States Patent Office 3,430,697
Patented Mar. 4, 1969

3,430,697
PIPE CASING SIDE CONNECTOR
William Wellstein, P.O. Box 430,
Fostoria, Ohio 44830
Filed Aug. 16, 1965, Ser. No. 479,916
U.S. Cl. 166—85                                17 Claims
Int. Cl. E21b *33/03, 33/128;* F16l *19/06*

ABSTRACT OF THE DISCLOSURE

A pipe casing side connector for use in a well system having a casing with a hole therein, wherein: an outer connector member having a duct aligned with the casing hole is fixed to the exterior of the casing; an inner connector member disposed within the casing and having a duct aligned with the duct in the outer connector member and releasably sealingly connected thereto; and a rotary means for operating a pivoted lever on the inner member urges the duct of the inner member into sealing engagement with the duct of the outer member. Also a locking means releasably attached to an elevational positioning means or lift pipe affixed to the inner member holds the duct of the inner member in an aligned position with the duct in the outer member when the duct of the inner member is being urged into or out of sealing engagement with the duct of the outer member.

FIELD OF THE INVENTION

This invention relates to means for assembling and disassembling a connecting means for a duct through a hole in the side wall of a casing, and means for aiding insertion of the connector into or removing it from the casing.

A common application for such a connecting means is found in modern water well systems wherein a number of functional parts deep within the well casing cooperate to transmit the fluid from the well through an encased duct or ducts laterally through a hole in the wall of the well casing which hole may be located at a substantial distance below the top of the well casing and usually is located a sufficient depth below the surface of the ground to avoid freezing and other superficial hazards.

One problem of prime importance is the sealing of the below the surface casing hole when detachably connecting means is used, which will satisfy various local installation codes and which will prevent the infiltration of surface water and such accompanying impurities as might be found near barnyards or areas wherein septic tanks are used. For systems of this type there is a substantial advantage in having a connecting means which may be manipulated from the top of the casing to readily join or disjoin internal components of the system from a lateral external duct and thereby permit installation or removal of the internal components through the top of the casing located above ground. Such a connecting means facilitates servicing of the functional parts within the well without dismantling the balance of the system.

SUMMARY OF THE INVENTION

Generally, the device of this invention comprises inner and outer connecting means or coupling members which are adapted to be releasably connected together to form either single or plural sealed ducts or passageways through a selectively placed hole in the wall of a pipe casing. The sealing means may be disposed between: the inner and outer coupling members, the inner member and the interior casing wall, the outer member and the exterior casing wall, and/or combinations thereof; and the sealing means may comprise metal to metal contact including welding, an intermediate resilient gasket or gaskets, and/or combinations thereof.

The inner coupling member may be inserted through the open end of the vertical casing and includes snout means which cooperate with the outer coupling member so that it may be easily positioned and aligned with the cooperating duct or ducts in the outer member. A lift pipe may be connected to the top portion of the inner duct member such as by thread means whereby the inner duct member may be lowered into position and urged into mating alignment with the outer duct member. An adjustable suspension and guide means such as a clamp-arm cross-arm longer than the diameter of the casing may be provided to prevent loss down the well or casing of the inner duct member in any pipe or parts connected thereto, and as an additional function to assist in the elevational positioning and the alignment of the duct members. When the ducts are aligned, an urging force may be exerted by a screw operated pivotal lever mechanism, the lever of which is pivotally mounted on the side of the inner coupling member opposite the sealing and aligning means in such a position that the movement of the operating screw will, directly or through an intermediate means or wedge, cause one end of the lever to be pressed against the interior wall of the casing opposite the hole therein to force and hold the inner member in a firm sealing engagement against the outer member and/or casing wall. The operating screw is preferably placed in the upper portion of the inner duct member above the pivotal lever where it may be operated from the open end of the casing by a removable and rotatable wrench rod which may extend through the aforementioned lift pipe.

The outer coupling member may be affixed to the casing in at least a relatively rigid manner, such as by a U bolt means or by welding. The weld-on type of outer duct member is provided with a V shaped underside with each side of the V portion disposed upwardly at a substantial angle to a horizontal line when placed in a welding position on the vertical casing, thus making it easily accessible for welding from above.

Accordingly, it is an object of this invention to produce an efficient, simple, effective, economic, rugged, protected, and dependable connecting device which may be readily uncoupled and recoupled at frequent intervals or after long periods of inattention as may be determined by the usually sporadic service requirements of a fluid flow or well system.

It is another object of this invention to produce a connecting device which will readily form a sealed passageway through a hole in a casing irrespective of normal irregularities in the hole or casing, the sizes and number of the pipes, to be connected through the hole, and also meet local sanitation codes.

It is another object of this invention to produce a connecting device which is easy to insert, locate, remove and relocate with reference to a hole which is not readily visible.

It is another object of this invention to produce a coupling device having a weld-on type of outer member with a V shaped under side designed for ease of welding and inspection in confined areas, such as near the bottom of a narrow and/or deep excavation.

BRIEF DESCRIPTION OF THE DRAWINGS

The above mentioned and other features and objects of this invention and the manner of obtaining them will become more apparent and the invention itself will be understood best by reference to the following description of embodiments of the invention taken in conjunction with the accompanying drawings wherein:

FIG. 6 is an elevation view in vertical section of the pipe casing side connector similar to FIG. 1 but of another embodiment of this invention, with a screw operated downwardly applied wedge means for urging the pivotal clamp lever against the casing;

FIG. 7 is a fragmentary view of a further embodiment of the pipe casing side connector shown in FIG. 6, but with an upwardly applied wedge means for operating the pivotal clamp lever;

FIG. 8 is a plan view in section of the pipe casing side connector shown in FIG. 6 taken along line VIII—VIII thereof;

FIG. 9 is a partially sectioned plan view of the resilient O ring gasket for the inner coupling member shown in FIGS. 6 and 8;

FIG. 10 is a front view of the clamp-on outer coupling member shown in FIG. 8;

*Description of the preferred embodiments*

Figure 1:
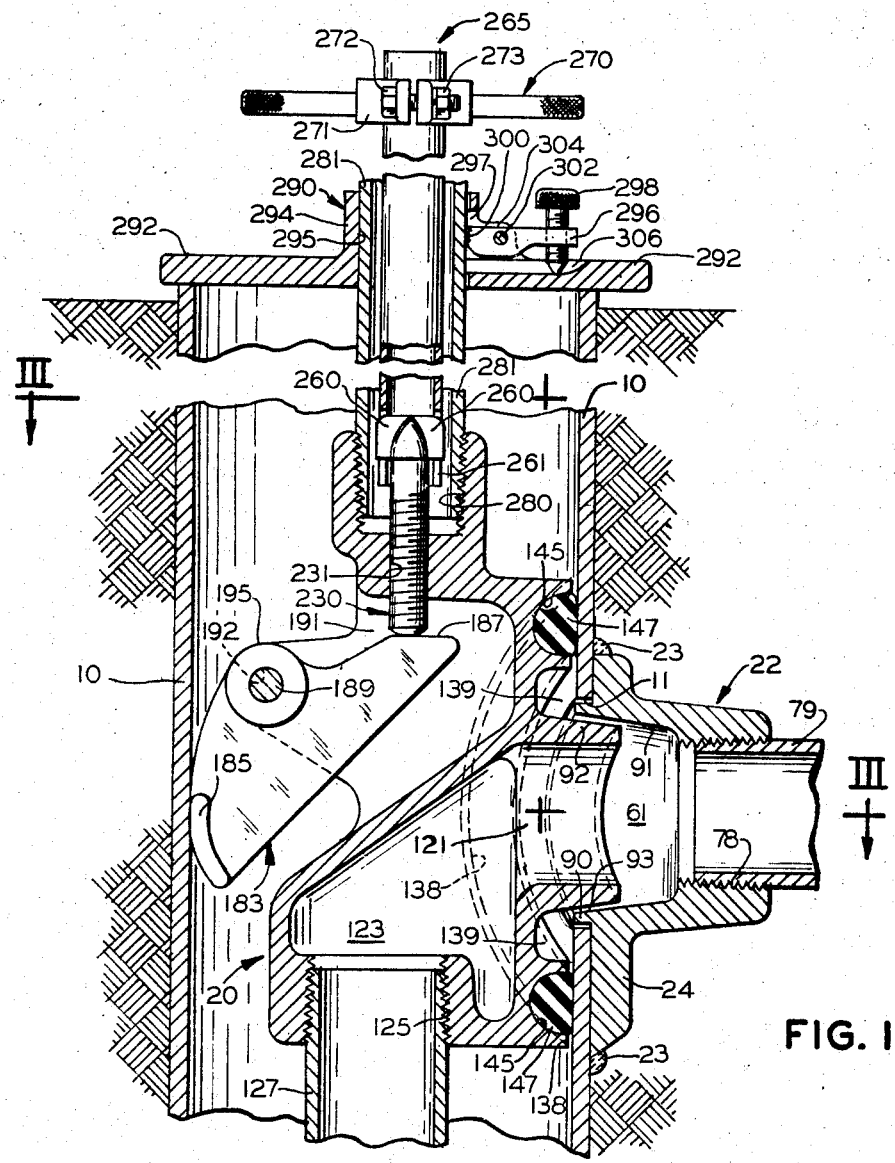
FIG. 1 is a horizontally segmented elevation view in vertical section of one embodiment of the pipe casing side connector of this invention in a coupled state with a weld-on outer coupling member.

Referring to the drawings, FIG. 1 shows a relatively rigid cylindrical casing 10 containing a removable inner coupling member 20 and a fixed outer coupling member 22 each having ducts therein which may be sealingly engaged to form a passageway through a lateral hole 11 suitably made in the wall of said casing 10 intermediate its ends. More than one hole may be provided in the casing when a plurality of ducts are required such as holes 12 and 13 in FIG. 20. The component parts of inner coupling member 20 and outer coupling member 22 are preferably made of a relatively non-corrosive and durable material.

(I) *The external coupling member*

Figure 2:
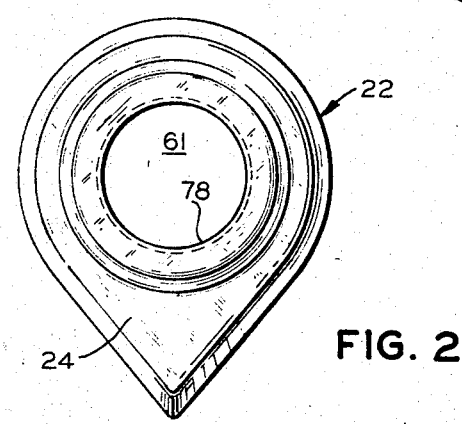
FIG. 2 is a front view of the weld-on outer coupling member with a V shaped underside shown in FIG. 1.

The external coupling member 22 is basically cylindrical in form with certain modifications dependent upon the method used to affix the outer coupling member to the casing 10 and whether or not single or plural ducts are required. When the outer coupling member 22 is affixed by welding 23 as shown in FIGS. 1, 13, 14, 15 and 19, the underside portion 24 of the outer coupling member may have a V shape 24 as is particularly shown in FIG. 2.

When the outer coupling member is to be affixed by U bolt means, outwardly extending horizontal arms may be integrally attached to the outer coupling member. If a bolt-on outer coupling member 32 (FIGS. 3, 4), 72 (FIG. 17) or 62 (FIGS. 20, 21) is affixed by a relatively rigid U bolt 34, the outwardly extending arms 36 must be sufficiently long to provide for holes 38 in the outer ends thereof spaced apart a distance equal to the opening between the threaded ends 40 of the U bolt 34, this distance generally being equal to the outside diameter of the casing 10 as shown in FIGS. 3, 4, 17, and 21. Threaded nuts 41 are provided for the ends of the U bolt to draw the outer coupling member against the casing 10. When the clamp-on outer coupling member 42 (see FIGS. 6, 8 and 10) is to be affixed by a U shaped clamp 43 having a flat semi-flexible yoke section 44, the outwardly extending arms 46 of the outer coupling member 42 may be substantially shortened because the flexible yoke section 44 of the clamp 43 allows the clamp to be wrapped more than half way around the casing 10, and the threaded ends 48 to be converged and inserted into their corresponding holes 50 which may be spaced apart substantially less than the outside diameter of the casing 10.

Figure 11:
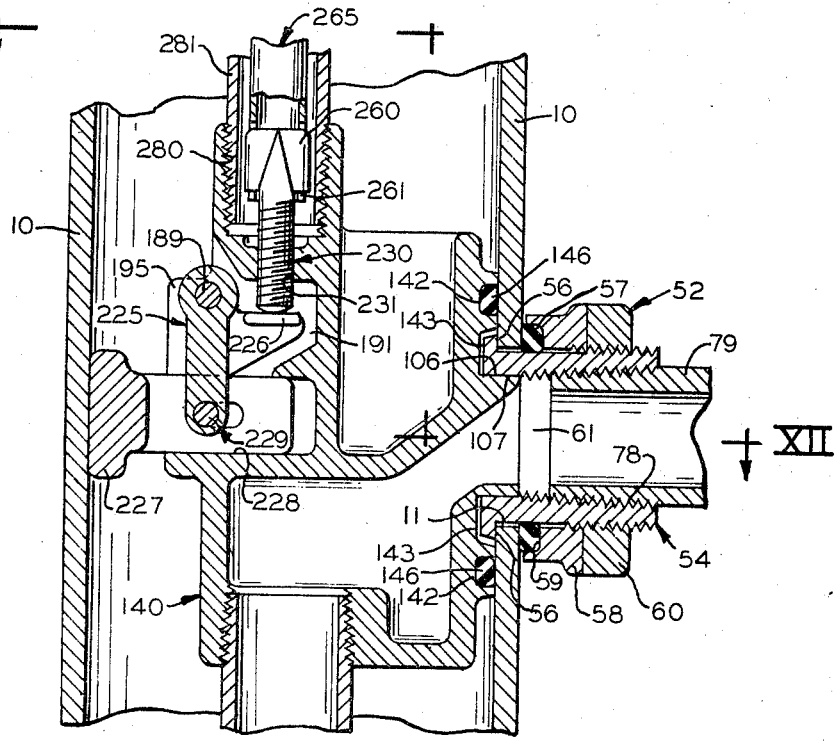
FIG. 11 is a vertical sectional view of still another embodiment of the pipe casing side connector of this invention, showing a thread fastened outer coupling member and a plunger operated inner coupling member.
Figure 12:
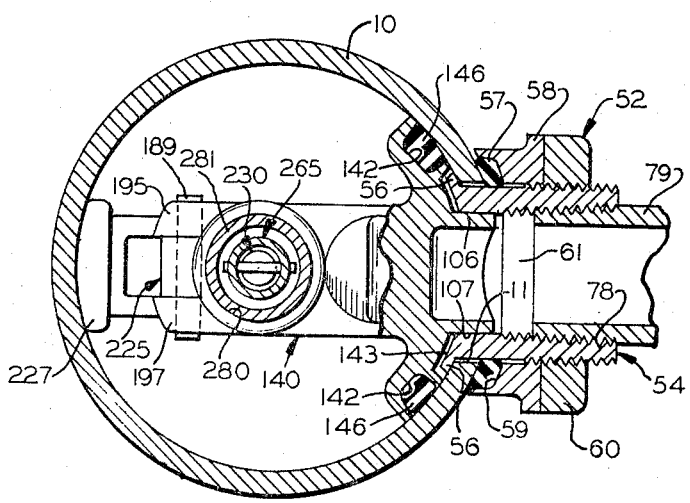
FIG. 12 is a sectional plan view of the pipe casing side connector shown in FIG. 11 taken along line XII—XII thereof.

The outer coupling member 52 may be adapted for affixing by a threaded means as shown in FIGS. 11 and 12, where an internally and externally threaded neck section 54 may be inserted through the hole 11 in the casing 10 until an annular lip 56 at the inner end firmly contacts the interior of the casing around the hole. An O ring gasket 57 having a generally rectangular cross section may be placed on the exposed neck section 54 from outside the casing and pressed against the casing. A follower 58, with a laterally concave face containing an annular groove 59 having a cross-section at least slightly less than the cross-section of the aforementioned gasket seal 57, may be placed upon the threaded neck section 54 followed by a threaded nut 60 which may be screwed inwardly until the follower 58 compresses the gasket 57 against the casing 10 thereby effecting a fluid tight seal between the coupling member 52 and the casing 10.

Figure 14:
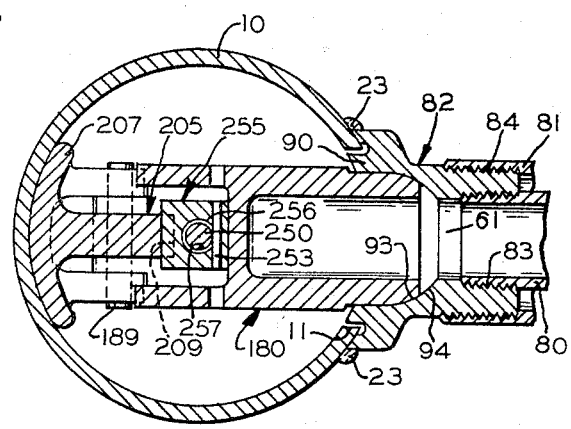
FIG. 14 is a sectional plan view of the pipe casing side connector shown in FIG. 13 taken along line XIV—XIV thereof.
Figure 15:
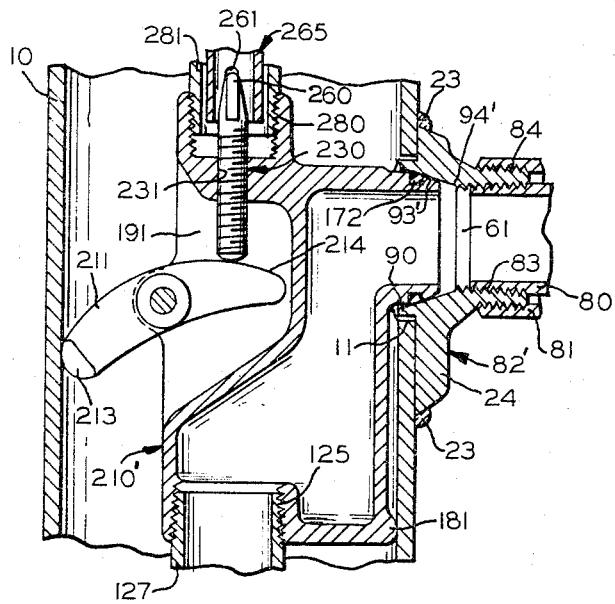
FIG. 15 is a vertical sectional elevation view of a pipe casing side connector similar to FIG. 13 but of another embodiment showing an inner coupling member having a resilient seal which engages the outer coupling member; and a screw operated arcuate coupling lever instead of a wedge operated lever on the inner member.
Figures 16, 18:
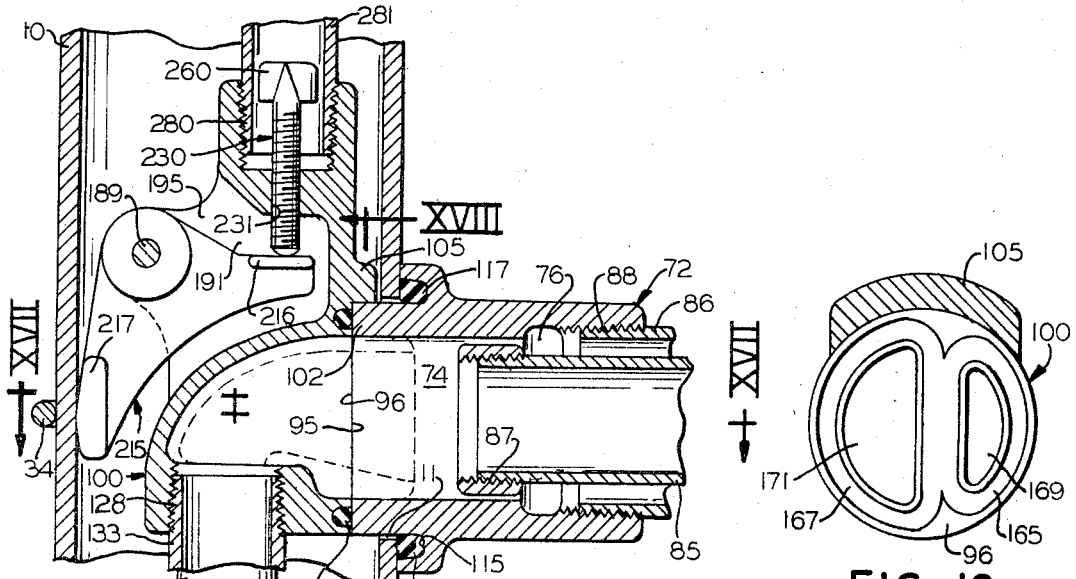
FIG. 16 is a vertical sectional elevation view of a pipe casing side connector according to this invention adapted for plural pipes through a single hole in the well casing.
FIG. 18 is a sectional view of the inner coupling member shown in FIGS. 16 and 17, taken along line XVIII—XVIII of FIG. 16 showing the saddle in section for resting on the inner coupling member.
Figure 17:
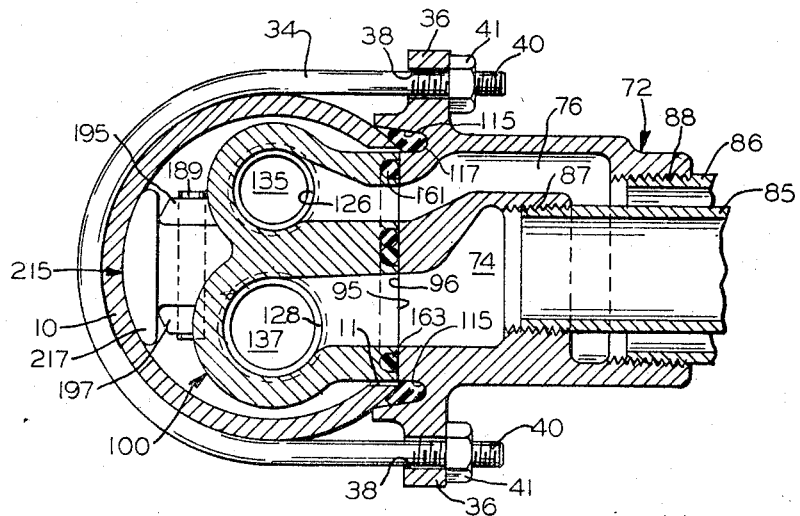
FIG. 17 is a sectional plan view of a pipe casing side connector shown in FIG. 16 taken along line XVII—XVII thereof, showing a U bolt fastening means for the outer coupling member.

The basic outer coupling member may be adapted for single or plural ducts. If a single duct is preferred, such as is shown in FIGS. 1, 2, 3, 4, 6, 8, 10, 11, 12, 13, 14 and 15, the duct 61 has a generally direct path through the outer coupling member 22. If the outer coupling member is adapted to contain a plurality of ducts, such as outer coupling member 62 shown in FIGS. 20 and 21, the lower one 63 of two ducts may take a direct path through the outer coupling 62 while the upper duct 64 may take an offset or meandering path therethrough. In this embodiment of FIGS. 20 and 21, the ends of the ducts adjacent the casing 10 are vertically spaced apart a substantial distance and each is aligned with one of two cooperating vertically spaced holes 12 and 13 in casing 10. FIGS. 16 and 17 show an outer coupling member 72 having two ducts 74 and 76 which are merged at the end adjacent the casing 10 into slightly spaced apart proportionate sectors of a cylinder for passage through a single hole 11 in said casing 10.

Figure 13:
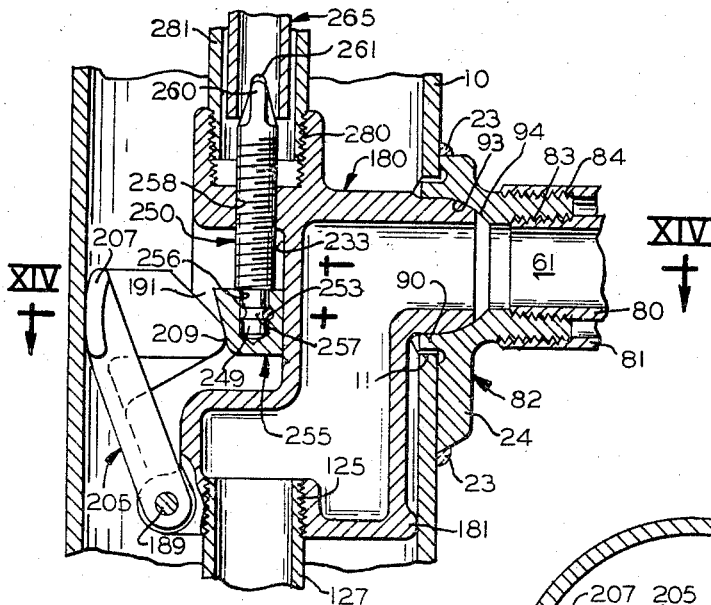
FIG. 13 is a vertical sectional elevation view of a pipe casing side connector showing still a further embodiment of this invention with concentric pipes on the outer coupling member and a metal to metal ball and socket joint type seal between coupling members.

In an outer coupling member adjacent the outer end of each duct, a means such as threads 78 (see FIGS. 1, 3, 4, 6, 8, 10, 11, 12) is provided for connecting a pipe 79 disposed laterally with respect to the casing 10. When concentric pipes 80 and 81 are to be used, the outer end of the coupling member 82 may have internal 83 and external 84 thread means for connecting said pipes as shown in FIGS. 13, 14 and 15. FIGS. 16, 17, 20 and 21 show concentric pipes 85 and 86, each connected to one of two ducts in coupling member 72 or 62, respectively, by spaced apart concentric internal thread means 87 and 88.

Figure 19:
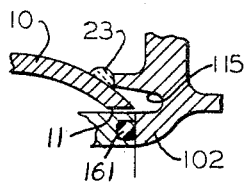
FIG. 19 is a fragmentary sectional view of a weld-on type connection for the outer coupling member shown in FIG. 17, thereby eliminating the outer gasket against the well casing.
Figure 20:
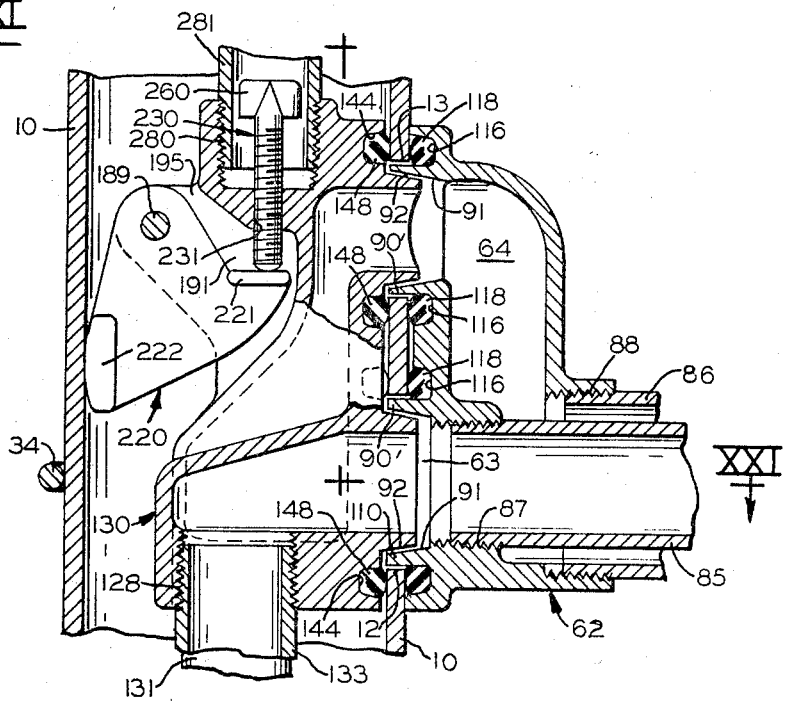
FIG. 20 is a vertical sectional elevation view of a pipe casing side connector according to this invention adapted for double ducts each of which passes through a separate hole in the well casing.
Figure 21:
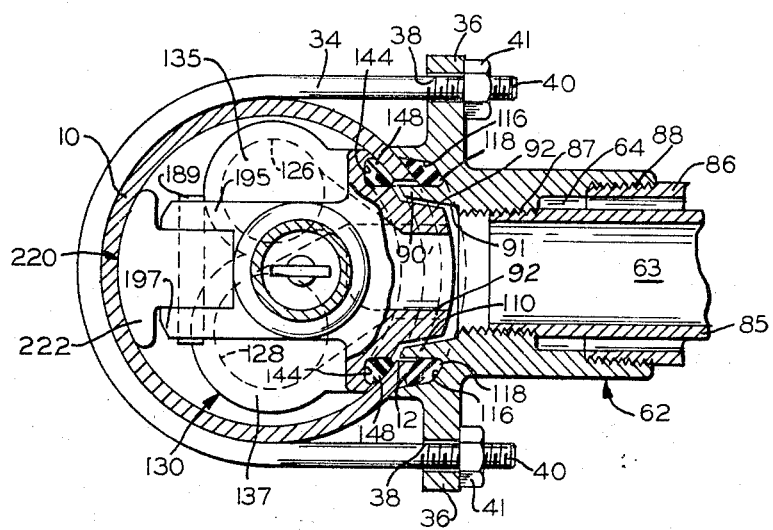
FIG. 21 is a sectional plan view of the pipe casing side connector shown in FIG. 20 taken along line XXI—XXI thereof.

Surrounding the internal end of the duct in the outer coupling member adjacent the casing 10 is an annular collar, such as flange 90 in FIGS. 1, 3, 6, 8, 13, 14, 15, or projecting end 102 in FIGS. 16 and 19, or flanges 90' in FIGS. 20 and 21 for positioning and supporting the outer coupling in the holes 11, 12, and 13 of the casing 10.

The internal end of the duct or ducts of the outer coupling member adjacent the casing 10 may be belled out to form a conical section 91 such as in FIGS. 1, 3, 4, 6, 8, 20 and 21, so that a converging conical male neck portion 92 around the mating end of a duct in the inner coupling member 20 can be urged into accurate coupling alignment with the duct 61 of the outer member 22. FIG. 15 shows an outer coupling member 82' with a conical section 94' having a finished mating surface at the inner end of duct 61 adapted for sealing when the engaging surface 93' of a cooperating inner coupling member carries a resilient seal. The mating sections at the adjacent ends of the inner and outer ducts of the coupling members also may be adapted to provide a metal to metal seal in addition to the supporting and aligning characteristics of the relatively loosely interfitting conical mating sections. FIGS. 13 and 14 show precisely made generally hemispherical or ball and socket type mating sections 93 and 94, respectively, for inner and outer coupling members providing a metal to metal ball type seal between said members. FIGS. 16, 17, and 18 show an embodiment having flat mating surfaces 95 and 96 at the adjacent ends of cooperating ducts of inner 100 and outer 72 coupling members, and an arcuate support and alignment section 102 atop the outer coupling member inside the casing 10 which section cooperates with an arcuate overhang 105 adjacent the upper front section of inner member 100 (see FIG. 18). FIGS. 11 and 12 show straight concentric cylindrical mating surfaces 106 and 107, respectively, for inner 140 and outer 52 coupling members.

Figure 3:
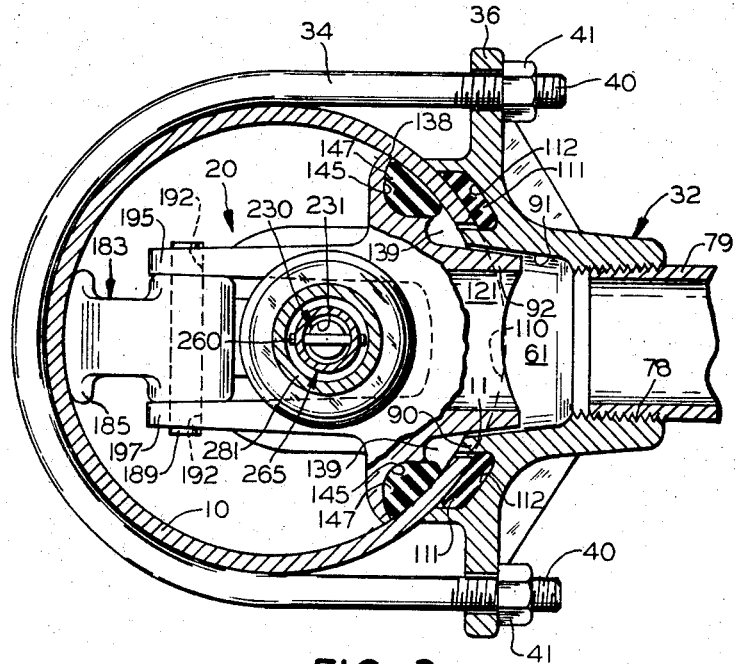
FIG. 3 is a partially sectioned plan view of the pipe casing side connector similar to that shown in FIG. 1 (and as if taken along line III—III thereof), but with a bolt-on outer coupling member in place of the weld-on outer coupling member.
Figure 4:
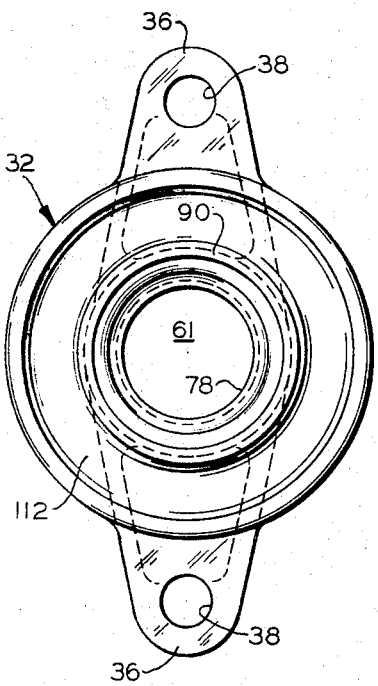
FIG. 4 is a view of the bolt-on outer member shown in FIG. 3 taken from the casing side.

The surface of the outer coupling member adjacent the casing may be laterally concave conforming substantially to the outer diameter of casing 10. When the outer coupling member is to be affixed to the casing by a U bolt 34, a clamp 44, or the like, the concave face of the outer coupling member may contain an annular groove surrounding the duct for the purpose of retaining a resilient gasket seal. FIG. 3 shows the outer coupling member 32 with an enlarged laterally concave face 110 containing a relatively large flat resilient ring gasket 111 in an annular groove 112 surrounding the collar 90 for providing a fluid tight seal between the outer member 32 and the casing 10 when the outer coupling member is drawn towards the casing by a U bolt means. FIGS. 6, 8 and 10 show an outer coupling member 42 with a sealing ring groove 113 for a resilient gasket seal 114 having a generally circular cross section. Similarly, the outer coupling members 72 and 62 in the embodiments shown in FIGS. 16, 17 and 20, 21 are provided with grooves 115 and 116 which conform with the cylindrical outer surface of the casing 10 around the projecting surface 102 and projecting flanges 90', respectively, which projections are inserted into holes 11, and 12, 13. These grooves retain sealing gaskets such as O rings 117 and 118 to provide fluid tight seals between the outer coupling members 72 and 62 and the casing 10. When the outer coupling member is welded to the casing such as shown in FIGS. 1, 13, 14, 15, and 19, the resilient seal is not needed between said member and said casing because the weld 23 provides a seal between the outer coupling member and the casing 10.

*(II) The inner coupling member*

Figure 5:
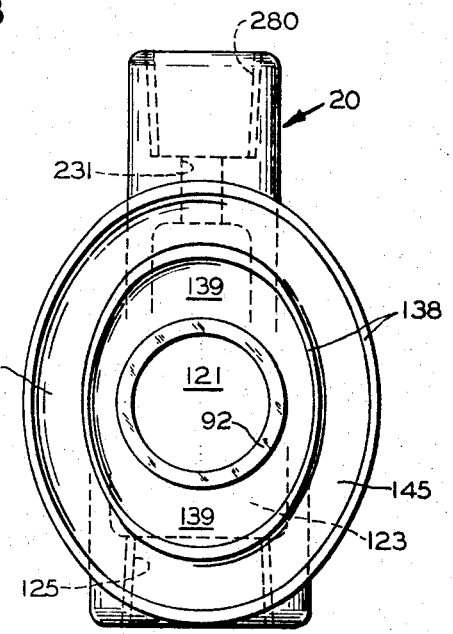
FIG. 5 is a front view of the inner coupling member shown in FIG. 1 or 3.

The basic inner coupling member 20 as shown in FIGS. 1, 3 and 5, has an elbow duct, the upper portion 121 of which is laterally disposed and the lower portion 123 of which is longitudinally disposed with respect to the casing 10. Adjacent the lower end of the duct section 123 is a thread means 125 for attaching a depending pipe 127. Where a plurality of ducts are required such as the inner coupling member 100 shown in FIGS. 16 and 17, and the inner coupling member 130 shown in FIGS. 20 and 21, two pipes 131 and 133 may be each connected by thread means 126 and 128 to one of two adjacent ducts 135 and 137 at the lower end of inner coupling member 100 or 130, respectively.

Around the conical male neck section 92 adjacent the lateral duct portion 121 in FIGS. 1, 3 and 5, is a laterally convex surface 138 conforming substantially to the interior radius of the casing 10, which convex surface 138 contains a generally circular recessed section 139 around the base of the male neck section 92. Said recessed section 139 is provided for the purpose of avoiding inwardly extending protrusions closely adjacent the hole in the casing 10 which might interfere with the proper seating of the sealing surfaces. Inner coupling member 140 (see FIGS. 11 and 12) has a similar recessed section 143.

Lying outwardly from the recessed section 139 and also contained in the said convex surface is an oval shaped groove 145 (see FIG. 5) for retaining a relatively large resilient sealing ring gasket 147 for pressing against the inside surface of casing 10. To insure a consistently better seal, the inner dimensions of the sealing ring 147 substantially exceed the diameter of the hole in the casing 10 so that possible burrs, slag or other irregularities in close proximity to said hole, which might normally result from cutting the passage hole in the casing 10, are avoided. Similar resilient sealing means are provided in grooves 142 and 144 formed in the inner coupling members 140 and 130, respectively, as shown in the embodiments of FIGS. 11, 12 and 20, 21. These grooves conform to the interior cylindrical surfaces of casing 10 and contain a portion of the gaskets or O rings 146 and 148 which surround the recessed section 143 of the embodiment shown in FIGS. 11 and 12, and the two conical male neck portions 92 of the embodiment shown in FIGS. 20 and 21.

The inner coupling member 150 in FIGS. 6 and 8 has an O ring seal groove 151 with a planar backing section 153 for containing an O ring 155 having a back section 157 lying in a vertical plane and a laterally convex front surface 159 as shown in FIG. 9.

Where the sealing surfaces are both closely toleranced finished surfaces such as the flat mating surfaces 95 and 96 as shown in FIGS. 16, 17, and 18, the sealing ring gaskets 161 and 163 in grooves 165 and 167 around respective ducts 169 and 171 (FIG. 18), may have relatively small cross sections. FIG. 15 shows an O ring 172 contained in an annular groove adjacent the outer end of a hemispherical neck section 93' of the inner coupling member 210'. It is to be understood that in lieu of a removable O ring 172 the hemispherical neck section 93' may be covered with a removable or fixed resilient liner. FIGS. 13 and 14 show a precisely made metal to metal ball 93 and socket 94 seal adjacent the mating ends of ducts of the inner 180 and outer 82 coupling members that does not require a resilient sealing ring or a laterally convex ring backing surface on the face of the coupling member 180. A laterally convex rib section 181 adjacent the lower end of the face of inner coupling member 180 may be provided for engaging the casing 10 and maintaining the generally vertical position of the pipe 127, connected at the bottom of said member 180.

On the side of the inner coupling member 20 (FIGS. 1 and 3) opposite the sealing means, a remotely operated pivotal lever means 183 is provided for pressing against the inner wall of casing 10 opposite the passage hole 11 and for exerting a coupling force in the direction of the outer coupling member 22. The lever 183 may have a casing engaging arcuate toe section 185, a heel section 187 opposite therefrom against which an operating force may be applied, and a fulcrum pin 189 located in a vertical plane between said toe and heel sections. A recessed section 191 located in the back of inner coupling member 20, generally behind the lateral duct portion 121, is provided to receive the heel section 187 of lever 183 and to permit its pivotal movement from a retracted to an extended position. Each end of the fulcrum pin 189 may be contained in one of two aligned holes 192 in laterally spaced apart lugs 195 and 197 located at the back of coupling member 20. FIGS. 6 and 7 show a pivotal lever 199 and 199' with their fulcrum pins 189 located substantially above their heel portions 201 and 201' and their toe portions 203 and 203', whereas FIG. 13 shows an inverted lever 205 having the fulcrum pin 189 located below its heel 209 and toe 207 portions. FIG. 15 shows an inner coupling member 210' having a pivotal level 211 with a toe 213 and an arcuate heel section 214 for operating in a wide range of casing diameters. FIGS. 16–17, 20–21 and 11–12 show respectively bell-crank levers 215, 220, and 225. The bell-crank type levers 215 and 220 are similar to lever 183 in FIGS. 1 and 3, and are provided with heels 216 and 221 and toes 217 and 222, respectively. The lever 225 of FIGS. 11 and 12 has a heel portion 226 and a separable casing engaging toe section 227 in the form of a plunger located in a horizontal slide 228 directly below the lower end of the bell-crank lever 225 and attached to said lever by a pin and slot means 229.

Force may be exerted against the heel section 187 (see FIG. 1) of the coupling lever 183 by the rotation of a vertically disposed operating screw 230 located in a threaded hole 231 in the inner coupling 20 above the said heel section 187. This force in turn causes the toe section 185 of the lever to be pushed against the casing 10 thereby moving the inner coupling member 20 towards the outer coupling member 22 and into sealing engagement therewith. If a vertically movable intermediate wedge means is used to exert pressure against the heel section of the coupling lever, the recessed section 191 may contain a vertical slide surface 233 (in FIGS. 6, 7, and 13). FIG. 7 shows an upwardly operated internally threaded wedge means 235 cooperating with the threaded lower end 237 of a vertically disposed operating screw 240 which is rotatively secured in a vertical hole 241 above the wedge means 235 by a retaining pin 242 which intersects such hole and cooperates with a ring groove 244 on the unthreaded upper portion of said screw 240. FIGS. 6 and 13 show downwardly operated wedge means 245 and 255 respectively each having a vertical unthreaded hole 246 and 256 where the unthreaded lower end 249 of a vertically disposed operating screw 250 is rotatably held by a retaining pin 253 which intersects said hole and cooperates with a ring groove 257 around said lower unthreaded end 249 of said operating screw 250. The moving force is provided by the vertical coupling screw 250 threaded into threaded hole 258 in the inner coupling members 150 and 180.

The head portion of the vertical operating screws 230 (see FIGS. 1, 3, 11, 15, 16 and 20) and 250 (see FIGS. 6 and 13) may be provided with diametrically opposed outwardly extending lugs 260 to correspond with slots 261 at the lower end of a detachable rod wrench 265. The rod wrench 265 is of a sufficient length to extend beyond the top of casing 10 and allow for the attachment of a turning means such as a clamp-on handle member 270 (see FIG. 1), having a split collar 271 clamped together by bolt 272 and nut 273.

The upper portion of the inner coupling members 20, 100, 130, 140, 150, 180 and 210' surrounding the head of the operating screws 230 or 250 may be internally threaded at 280 for the purpose of attaching a lift pipe 281 which is sufficiently long to extend above the casing 10 (see FIG. 1) where it may be adjustably held by a cam lock suspension and alignment means 290 capable of supporting upon the top of a casing 10 all of the attached encased components of a well system including a pump, foot valve, pipes, pipe coupling members, and the like. The suspension and alignment means 290 has members such as cross arms 292 disposed laterally to the casing and affixed to a central collar section 294 having a vertical hole 295 therein slightly larger than the lift pipe 281. A cam lever 296 with a vertically disposed thumb screw 298 adjacent its external end and a gripping surface 300 adjacent its internal end may be pivotally attached by a pin means 302 to lugs 304 located laterally adjacent each other on the collar section 294 above one of the cross arms 292. A recess 306 may be provided in the one of said cross arms to accommodate a lower portion of the cam lever 296 and thumb screw 298. The gripping surface may be cammed into the pipe hole 295 through opening 297 in the collar 294, and against the lift pipe 281 by turning the thumb screw 298 against its corresponding recessed section 306, thereby securely holding the suspension means on the lift pipe 281 at its determined elevational relationship with the outer coupling member 22. After the inner and outer coupling members have been sealingly coupled, the suspension means 290 may be removed by unscrewing the thumb screw 298 and applying pressure or striking the top of said screw 298 to release the gripping surface 300 from the lift pipe 281.

(III) *Operation*

In operation a suitable hole is made in casing 10 whereat the external coupling member 22, 32, 42, 52, 62, 72, or 82 may be affixed by the aforementioned clamping or threaded means or by welding. The components of the fluid flow system which are to be placed inside the casing 10 are then assembled with the internal coupling member 20, 100, 130, 140, 150, 180, or 210'. The elevational position of the outer coupling member with respect to the top of the casing 10 is determined and the suspension and alignment means 290 is correspondingly located on the lift pipe 281 at which time the assembly may be inserted through the top of the casing and lowered until the male sections 92, 93, 93', or 106, or saddle 105 of the internal coupling members are brought into entering alignment with the female sections 91, 94, 94', or 107, or projection 102, respectively of the external coupling members. This position is maintained with the aid of the suspension and alignment means 290 until the socket end of the rotating wrench 265 is lowered through the hoisting pipe 281 and made to properly engage the head 260 of the operating screw 230, 240, or 250. The interior of the lift pipe 281 acts as a guide to locate the socket 261 of the rod wrench 265 on the concealed head of these operating screws. The adjustable wrench handle 270 is then positioned slightly above the top of the suspension and alignment means where it is tightened in place by means of bolt 272 and nut 273. As the wrench 265 is manually rotated in the proper direction by handle assembly 270 a pressure is exerted upon the heel section 187, 201, 201', 209, 214, 216, 221, or 226 of the clamp lever either directly by the vertical operating screw or by an intermediate wedge means which forces its corresponding toe section 185, 203, 203', 207, 213, 217, 222, or 227, respectively, radially outward into engagement with the casing 10. The opposed forces created thereby press the internal coupling members into a fluid tight engagement with the external coupling members at which time the wrench 265 and the lift pipe 281 may be removed and the top of the casing appropriately sealed.

While there is described above the principles of this invention in connection with specific apparatus, and while each modification is shown and described in combination with specific modifications of other elements, it is to be clearly understood that the modified elements of this invention may be otherwise variously arranged and that this description is made only by way of example and not as a limitation to the scope of this invention.

What is claimed is:

1. A pipe casing side connector comprising:
   (1) a casing with a hole therein intermediate its ends,
   (2) an outer connector member affixed at said hole and having,
      (a) a duct, one end of which is aligned with said hole,
      (b) means for connecting a pipe adjacent the other end of said duct, and
      (c) a means for sealingly affixing said connector to said casing,
   (3) an inner connector member having,
      (a) an elbow duct,
      (b) means for connecting a pipe at one end of said duct,
      (c) means for positioning the other end of said duct with said one end of the duct in the outer connector for their connection,
      (d) means for sealing the positioned connection between the other end of said duct and said one end of the duct in the outer connector,
      (e) a casing engaging single lever means pivoted on said inner member, and
      (f) rotatable means rotatably connected to said inner connector and rotatably engaging said lever for moving the casing engaging end of said lever means towards and against the casing to operate said sealing means to seal said positioned connection.

2. A pipe casing connector according to claim 1 including means for alignment of the outer end of said duct with said one end of said duct in the outer connector for their connection.

3. A pipe casing side connector according to claim 2 wherein the means for alignment are loosely interfitting conical portions adjacent the meeting ends of said ducts.

4. A pipe casing side connector according to claim 2 wherein the means for alignment and sealing of said ducts comprise precisely fitted ball and socket members adjacent mating ends of said ducts.

5. A pipe casing side connector according to claim 1 wherein the inner and outer connector members contain plural ducts.

6. A pipe casing side connector according to claim 1 wherein the outer connector member has means for connecting concentric pipes.

7. A pipe casing side connector comprising:
   (1) a casing with a hole therein intermediate its ends,
   (2) an outer connector member affixed at said hole and having,
      (a) a duct, one end of which is aligned with said hole,
      (b) means for connecting a pipe adjacent the other end of said duct, and
      (c) a means for sealingly affixing said connector to said casing,
   (3) an inner connector member having,
      (a) an elbow duct,
      (b) means for connecting a pipe at one end of said duct,
      (c) means for positioning the other end of said duct with said one end of the duct in the outer connector for their connection,
      (d) means for sealing the positioned connection between the other end of said duct and said one end of the duct in the outer connector,
      (e) a casing engaging single lever means pivoted on said inner member, and
      (f) rotatable means rotatably connected to said inner connector and connected to a wedge means which contacts the casing engaging lever means for moving the casing engaging end of said lever means towards and against the casing to operate said sealing means to seal said positioned connection.

8. A pipe casing side connector:
according to claim 1 wherein said outer connector comprises an affixing means around said hole having an outwardly extending V-shaped portion parallel to the axis of said casing, and welding means for sealingly connecting said affixing means to said casing.

9. A pipe casing side connector:
according to claim 1 wherein said means for the positioning of the inner connector member with respect to the outer connector member, comprises:
   (1) a vertical lift pipe connected to said inner member, and
   (2) a cam lock cross arm adjustably positioned with respect to said lift pipe, the length of said cross arm at least exceeding the inner diameter of said casing.

10. A pipe casing connection according to claim 1 wherein said lever means comprises a bell crank lever and said rotatable means is a threaded means for operating said lever.

11. A pipe casing side connector comprising:
   (1) a casing with a hole therein intermediate its ends,
   (2) an outer connector member affixed at said hole and having,
      (a) a duct one end of which is aligned with said hole,
      (b) means for connecting a pipe adjacent the other end of said duct,
      (c) a means for sealingly affixing said connector to said casing, and
   (3) an inner connector member having,
      (a) an elbow duct,
      (b) means for connecting a pipe at one end of said duct,
      (c) means for positioning the other end of said elbow duct with said one end of the duct in the outer connector member,
      (d) resilient sealing means between the inside of said casing around said hole and said inner connector member, and
      (e) means for urging said inner connector member against said resilient sealing means, comprising:
         (1) a casing engaging single lever means pivoted in said inner connector member, and
         (2) a remotely operated rotational means mounted in said inner connector member and rotatably engaging said lever for moving the casing engaging end of said lever means towards and against said casing to operate said sealing means to seal said positioned connection.

12. A pipe casing side connector according to claim 11 wherein the outer connector member has an annular collar which extends into the hole in the casing.

13. A pipe casing side connector according to claim 11 wherein the outer connector member contains a resilient sealing ring and is affixed by threaded means.

14. A pipe casing side connector according to claim 11 wherein the outer connector member has a V shaped under side for welding.

15. A pipe casing side connector according to claim 11 wherein the inner means for sealingly connecting said ducts is a large resilient O ring gasket contained partially in an oval groove in the face of the inner member surrounding said hole and spaced outward therefrom.

16. A pipe casing side connector according to claim 11 wherein said rotational means comprises a screw means for operating said lever means.

17. A fitting for a hole in the side of a well casing comprising:
(1) an outer member having a duct therethrough comprising:
 (a) means extending through said hole having a concave aperture therein forming one end of said duct,
 (b) flange means surrounding said hole outside said casing,
 (c) means for holding said outer member in position over said hole, and
 (d) means on said outer member for attaching a conduit, and
(2) an inner member having an elbow duct therein, comprising:
 (a) a convex projection for positioning in said concave aperture in said outer member forming one end of said L-duct,
 (b) means adjacent said projection for engaging the inside of said casing,
 (c) threaded means longitudinal of said casing and threadedly connected to said inner member having one end engageable by a tool extending through said casing for operating said threaded means,
 (d) means for sealing said L-duct to said duct in said outer member around said hole and to said casing,
 (e) single lever means pivoted adjacent said threaded means and operated thereby for engaging the inside of said casing opposite said hole for releasably holding said L-duct in said inner member into fluid tight sealing engagement with the duct in said outer member,
 (f) means adjacent the other end of said L-duct for attaching a pipe inside said casing, and
 (g) a removable positioning means for holding said inner member in position until said lever means is operated.

References Cited

UNITED STATES PATENTS

| | | | |
|---|---|---|---|
| 2,530,253 | 11/1950 | Maged et al. | 285—176 X |
| 2,623,467 | 12/1952 | Andrew | 285—133 X |
| 2,689,611 | 9/1954 | Martinson | 285—140 X |
| 2,771,955 | 11/1956 | Carter | 285—140 X |
| 2,949,961 | 8/1960 | Anderson | 166—85 |
| 2,998,847 | 9/1961 | Maass | 166—85 |
| 3,136,362 | 6/1964 | Baker | 166—85 |
| 3,183,973 | 5/1965 | Eging | 166—85 |
| 3,270,818 | 9/1966 | Pugh | 166—85 |
| 3,304,105 | 2/1967 | Hill | 285—302 |

CARL W. TOMLIN, *Primary Examiner.*

DAVE W. AROLA, *Assistant Examiner.*

U.S. Cl. X.R.

285—39, 140, 199, 308, 320